United States Patent
Dai et al.

(10) Patent No.: US 8,715,136 B1
(45) Date of Patent: May 6, 2014

(54) TORQUE CONVERTER SLIP CONTROL BASED ON MOTOR TORQUE DURING TRANSIENT EVENTS

(71) Applicant: Ford Global Technologies, LLC, Dearborn, MI (US)

(72) Inventors: Zhengyu Dai, Canton, MI (US); Hong Jiang, Birmingham, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/826,845

(22) Filed: Mar. 14, 2013

(51) Int. Cl.
*B60W 10/02* (2006.01)
*B60W 10/06* (2006.01)
*B60W 10/08* (2006.01)

(52) U.S. Cl.
USPC ............................................................ 477/5

(58) Field of Classification Search
USPC .................................. 477/5, 57, 58, 169, 176
See application file for complete search history.

(56) References Cited

U.S. PATENT DOCUMENTS

| | | | |
|---|---|---|---|
| 2003/0004032 A1* | 1/2003 | Tamor | 477/5 |
| 2009/0143189 A1* | 6/2009 | Hasegawa et al. | 477/5 |
| 2011/0231071 A1 | 9/2011 | Phillips | |
| 2012/0035819 A1 | 2/2012 | Hebbale et al. | |

FOREIGN PATENT DOCUMENTS

JP     2011-194941 A2    10/2011

\* cited by examiner

*Primary Examiner* — Edwin A Young
(74) *Attorney, Agent, or Firm* — David B. Kelley; Brooks Kushman P.C.

(57) ABSTRACT

A hybrid vehicle with an engine, an electric drive motor and battery, an automatic transmission with a torque converter having a bypass clutch, and a powertrain controller dynamically adjust the torque converter slip to balance fuel economy and drivability during a transient torque request by using motor torque to satisfy the transient torque and applying feed forward control of the fluid pressure in the bypass clutch based on the motor torque and feedback control of the slip to maintain torque converter torque ratio substantially constant during the transient event.

15 Claims, 2 Drawing Sheets

TORQUE CONVERTER SLIP CONTROL BASED ON MOTOR TORQUE DURING TRANSIENT EVENTS

TECHNICAL FIELD

The present invention relates to controls for hybrid vehicles including a drivetrain with an engine, an electric motor with electrical power source, and an automatic transmission with a torque converter having a bypass clutch, and multiple stepped ratio gears controlled by a powertrain controller that generates commands for the bypass clutch fluid pressure based upon the motor operation to maintain a target slip during a transient event.

BACKGROUND

In a conventional engine powered vehicle with an automatic transmission, a transmission controller manages the operation of the torque converter. The torque converter has a bypass clutch that manages torque transfer between the impeller and turbine of the torque converter. A bypass clutch may provide three modes of bypass clutch operation, and torque multiplication may occur depending on the amount of slip between the impeller and turbine sides. In open mode, a maximum amount of fluid is carried by the torque converter housing, separating the impeller from the turbine. In a locked mode, a minimum fluid pressure is carried in the torque converter so the pressure does not separate the impeller from the turbine and they become mechanically locked together, by which the fuel economy is preserved. In a slip mode, a limited amount of slip may be employed between the impeller and the turbine, whereby the fluid may provide the target torque ratio for the torque multiplication, in addition to NVH damping, but fuel economy is reduced due to the heat generated as a result of the slip.

In the slip mode, a target amount of slip called micro slip may be controlled by a feed forward control that commands the fluid pressure in the torque converter housing, a closed loop feedback control monitoring the slip, or a combination of both. However, the feed forward control predicts operation of a system based upon the engine torque estimation, but the difficulty in accurately estimating the engine torque value during an event such as tip-in, and the timing delay of a feedback circuit interfere with accurate control of the slip during a micro slip control event. Hybrid vehicles add to the complexity of powertrain control by including the monitoring and control of engine, traction motor, or both as motive sources in the driveline, as well as clutches and additional sensors and actuators.

SUMMARY

The present invention overcomes the above-mentioned disadvantages by providing an automatic step-ratio transmission, sometimes referred to as a modular hybrid transmission (MHT) and powertrain controller methodology that improves quality of control over micro slip by avoiding inaccurate estimation of engine torque. Rather, in a hybrid vehicle with both engine and motor sources, the torque converter micro slip control can be improved by reliance upon the electrical motor torque that may be ascertained more accurately than the engine torque. Therefore, limiting engine operation to steady state and using the motor torque control to adjust torque converter micro slip maintains the range of micro slip far more accurately than previously controlled through engine torque.

BRIEF DESCRIPTION OF THE DRAWINGS

The present invention may be more clearly understood by reference to the following detailed description of at least one embodiment, when read in conjunction with the accompanying drawing figures, in which like reference characters refer to like parts throughout the views, and in which.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular features. Therefore, specific structural and functional details disclosed herein are not to be interpreted as limiting, but merely as a representative basis for teaching one skilled in the art to variously employ the present invention.

Figure 1:
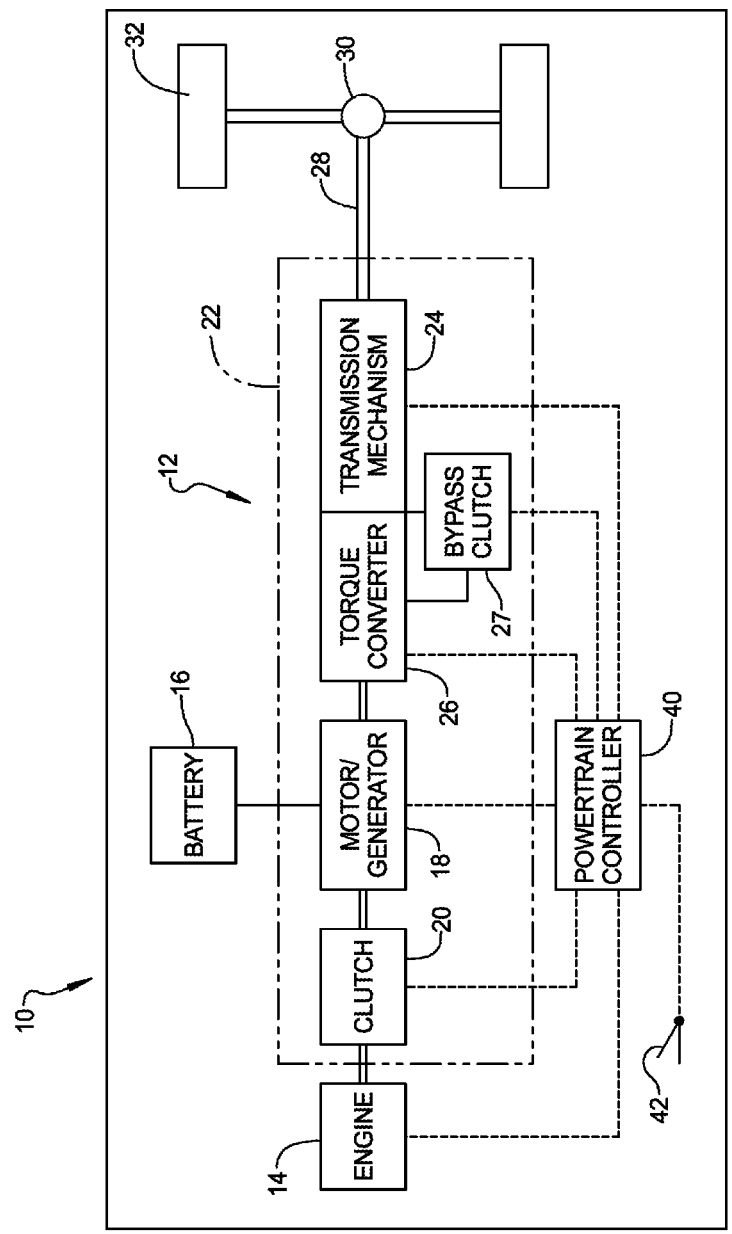
FIG. 1 is a diagrammatical view of a hybrid vehicle driveline with a step-ratio automatic transmission incorporating a powertrain controller system operating according to the present invention.
Figure 2:
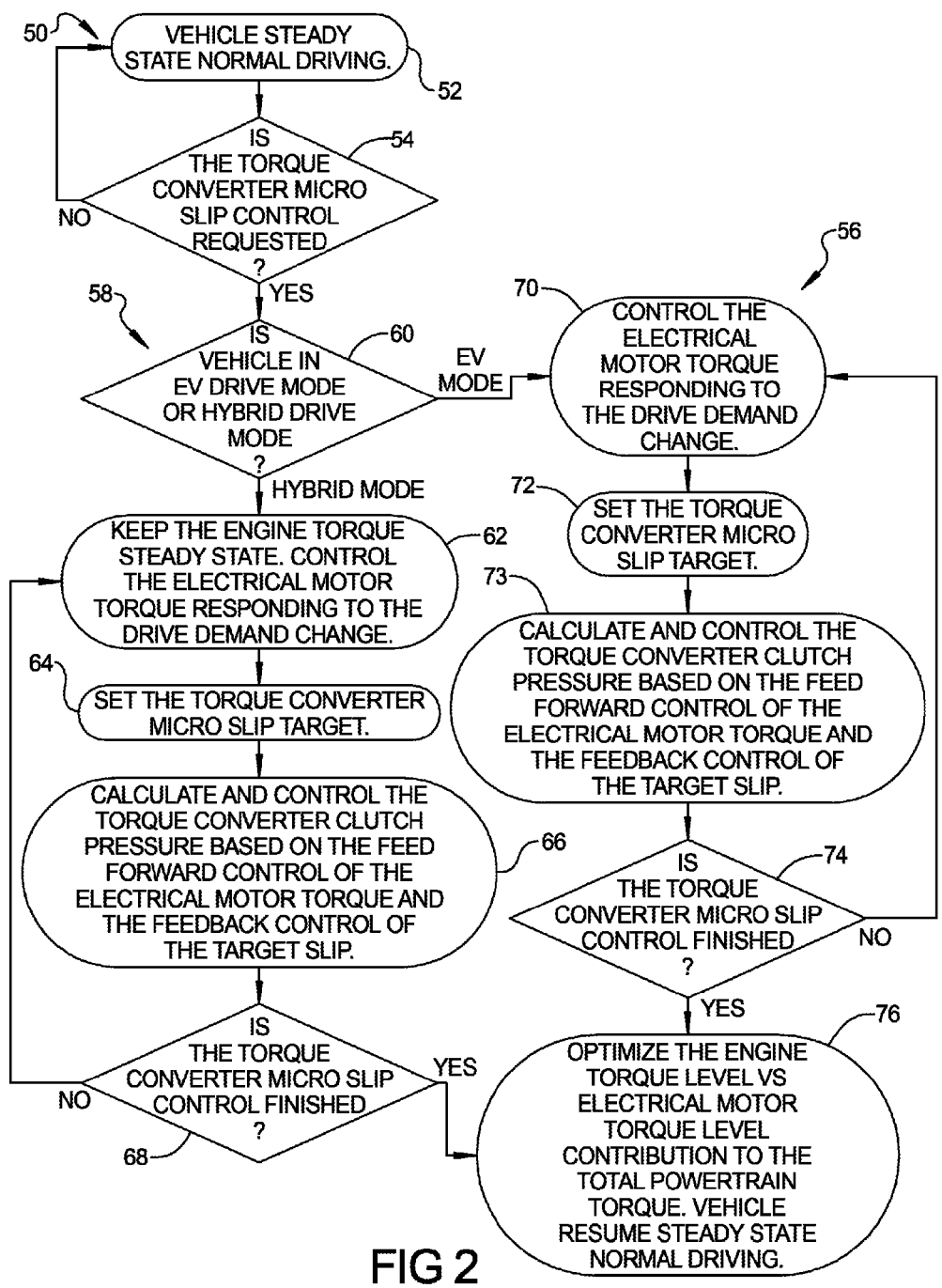
FIG. 2 is a flow chart of the control algorithm operating a torque converter control for micro slip according to one embodiment of the present invention.

Referring first to FIG. 1, a vehicle 10 is shown comprising a hybrid driveline 12 with a first power source in the form of internal combustion engine 14 and a second power source in the form of a battery 16 powering a motor/generator 18. One or more of the power sources may be coupled together and disengaged from each other in the driveline by means of a disconnect clutch 20. The disconnect clutch 20 may also be used to rotate the input shaft of the motor 18 by the clutch 20 so that operation of the engine 14 serves to charge the battery 16 as the motor 18 acts as a generator.

The engine 14 and the motor 18 have an output coupled to a transmission mechanism 24 through the torque converter 26. In one embodiment, a step-ratio automatic transmission, sometimes referred to as a modular hybrid transmission (MHT) 22 includes mechanical and hydraulic controls for a system of multiple, stepped ratio gears arranged for multiple forward speeds, reverse speed and a neutral position. In addition, MHT 22 includes a torque converter 26. The torque converter 26 includes an impeller, and a turbine that rotates in response to fluid flow from the impeller to the turbine. A bypass clutch 27 selectively couples the impeller and turbine of torque converter 26 and is controlled by the powertrain controller 40.

The bypass clutch 27 is controlled by fluid pressure between the impeller and turbine of the torque converter as required for three modes of bypass clutch operation, which include open, locked, and slipping. Torque multiplication occurs during the open and slipping modes of operation with the amount of torque multiplication depending on the slip speed between the impeller and turbine. In open mode, a maximum amount of fluid is carried by the torque converter housing, separating the impeller from the turbine. In locked mode, the minimum fluid pressure is carried in the torque converter so the pressure does not separate the impeller from the turbine and they become mechanically locked together, in which the fuel economy is preserved. In a slip mode, a limited amount of slip may be employed between the impeller and the turbine, whereby the fluid may provide the target torque ratio for the torque multiplication, in addition to NVH damping, but maintaining the slip to a preferred range that limits the reduction in fuel economy due to the heat generated as a result of slipping.

At the rear portion of the driveline, a drive shaft output 28 is linked to a differential 30 in the well-known manner of engine powered production vehicle systems, and in turn drives both of the rear wheels 32.

In accordance with the control system of one embodiment of the present invention, a powertrain controller 40 can include a distributed or integrated set of operating systems including engine control module (ECM), a transmission control module (TCM) and other vehicle systems control (VSC) modules. A driver demand actuator 42, such as an accelerator pedal, is linked either electronically, mechanically or by other systems to the powertrain controller 40. The actuator 42 permits the driver to control powertrain power to the vehicle and governs performance of the vehicle. The present invention improves driveability by reducing noise, vibration and harshness (NVH) that may be fed back to the driver without significantly impacting fuel economy as the operating conditions change during driving of the vehicle.

A desired torque converter slip may be a function of a transmission gear state, an impeller torque, a turbine or input speed, and/or an indirect measure of output speed or vehicle speed. An output of the transmission 24 may be represented by the rotational speed of the output shaft of the transmission 40, as determined by a signal 44 communicated to the controller 40 from an encoder, speed sensor, accelerometer, torque sensor, etc.

The controller 40 can be a single device or a number of devices. Control module, module, controller, control unit, processor and similar terms may mean one or various combinations of one or more of Application Specific Integrated Circuit(s) (ASIC), electronic circuits, central processing units (preferably microprocessor(s)) and associated memory and storage, executing one or more software or firmware programs, combinational logic circuits, input/output circuits and devices, appropriate signal conditioning and buffer circuitry, and other suitable components. Controller 40 may have sets of control algorithms, including software program instructions and calibration references stored in memory and executed to provide desired functions. Algorithms are executed at predetermined times or loops, such as by a central processing unit, and are operable to monitor inputs from sensing devices and other networked control modules, and execute control and diagnostic routines to control operation of actuators, or algorithms may be executed in response to occurrence of an event.

Torque converter slip may be controlled by application of bypass clutch 27 that includes structures mechanically, electronically, or fluidically operated to controllably couple the impeller and turbine of the torque converter while modulating an allowed slip with a feedback loop. A fluidic interaction between the impeller and the turbine multiplies torque based on induced slip. The torque being transmitted through the torque converter is referred to as torque converter torque or turbine torque, and is transmitted through the fluidic interaction between the impeller and the turbine. When the clutch 27 is fully open, turbine torque is transmitted entirely through the fluidic interaction with torque multiplication based on the speed difference or slip between the impeller and turbine. When the clutch 27 is fully locked, no slip between the impeller and turbine is possible, and the turbine torque equals the impeller torque being transmitted through the torque converter. When the clutch is in a slip mode, the torque being transmitted through fluid is controlled through the slip between the impeller and turbine. The pressure of hydraulic fluid to the bypass clutch actuator controls forces applied within the clutch and the resulting clutch torque so that the torque converter slip approaches a desired slip value or a reference slip. By modulating the pressure of the hydraulic fluid to the bypass clutch, torque converter slip for a given operating condition will be controlled. Therefore the torque converter torque transmitted through fluid is controlled.

Feedback control monitors an operating value, controls an output according to the variations from a desired value, and utilizes a resulting value of the controlled output to subsequently improve control to the desired value. Feedback control is known to control slip in a torque converter through variable pressure control in the clutch. The desired value can be a steady state term, substantially unchanging through a time period, or the desired value can be transitory, increasing or decreasing through a period or profile.

While torque converter slip can be controlled to some range of values in steady state operation, a rapid and significant change in impeller speed and torque will result in a disturbance. Tip-in throttle demands are known to result in rapid increases in torque converter slip. Since uncontrolled slip reduces efficiency of the powertrain operating and induces torque output disturbance to the output shaft, the slip should be controlled in a timely manner. Feedback control is reactionary and includes a lag time in the control response.

Feed forward control methods are used to predict operation of a system through transient operation and generate control commands based upon the predicted operation of the system. Feed forward control can be utilized in combination with feedback control to improve the accuracy of control and counter the effects of the feedback lag.

During an electrical drive mode of the powertrain, when the torque converter micro slip control event happens, for example a tip-in, a vehicle driver's use of the accelerator demanding more power from the powertrain controller, the electrical motor torque will be controlled to respond to the drive demand. In the meantime, the torque converter control of the powertrain controller will set the micro slip target. Then the torque converter clutch 27 fluid pressure will be controlled through the feed forward control 46 as a function of the electrical motor torque and monitoring by the feedback control 48 to control slip around the target slip until such event finishes.

Using control of the electrical motor torque in response to the drive demand change enables the micro slip range to be controlled more precisely in setting the torque converter micro slip target. As shown at 73, the controller may calculate and control the torque converter clutch pressure based on the feed forward control of the electrical motor torque and the feedback control of the target slip. When the micro slip event finishes, the need for micro slip control may be finished as shown at 74. At that point, the controller 40 may determine that engine operation is desired to preserve battery power or to charge the battery. When the vehicle resumes steady state normal driving, the controller may then optimize use of the power sources between the engine torque level versus electrical motor torque level contribution to the total powertrain torque.

During a hybrid drive mode, the micro slip control event initiates processing in the controller 40 to maintain the engine torque at a steady state as shown at 62. The electrical motor torque will be adjusted to respond to the drive demand. The torque converter clutch fluid pressure will be controlled through the feed forward control in response to the electrical motor torque, which is more readily ascertainable than predicted engine torque, and feedback control continues to adjust clutch pressure toward realizing the target slip. This avoids the difficulty of predicting engine torque to control the bypass clutch pressure command and controls the micro slip range more accurately as shown at 66. Once the event finishes at 68, the engine torque may again be increased or decreased with respect to the motor torque contribution, that may be conversely decreased or increased, depending upon the need to meet the drive demand and other vehicle conditions including the battery status.

The controller's reaction to a micro slip control event such as tip-in is to keep the engine torque at steady state. Then the control of the electrical motor torque responding to the drive demand change is used to control micro slip. The controller 40 may set the torque converter micro slip target and control the adjustment of slip based upon the motor control to calculate and control the torque converter clutch pressure based on the feed forward control of the electrical motor torque and the feedback control of the target slip as shown at 66 when the engine is contributing to steady state operation.

During a hybrid drive mode, the motor control may also be used to avoid the difficulty of reliance upon estimating engine torque to generate a slip control signal. An increase in demand from the actuator 42 is applied to the motor to generate corresponding more torque. The motor then provides an input for calculating a torque converter clutch pressure based on the feed forward control of the electrical motor and the feedback control of the slip calculation. When the pedal generates a decrease in demand, the motor adds loading by sending the current to the battery in a charging mode. The controller 40 calculates the command signal for controlling the bypass clutch pressure based on the feed forward control of the electrical motor torque and the feedback control of the target slip. Once the micro slip control need is finished, at the end of the events described above, at least one or both the engine and motor torque level can be optimized, for example, increase engine torque as the torque delivery from the motor will wind down, to adjust their contributions to the powertrain output torque and resume a normal steady state drive mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a driveline in a hybrid vehicle having an engine and an electric motor selectively coupled to an automatic transmission with a torque converter having a bypass clutch, comprising:
controlling bypass clutch pressure during a transient torque event to control torque converter slip using feed forward control based on electric motor torque and feedback control of the torque converter slip to maintain a desired torque ratio during the transient torque event.

2. The method as defined in claim 1 and comprising calculating the bypass clutch pressure while engine torque is maintained at steady state until the transient torque event is finished.

3. The method as defined in claim 1 comprising readjusting torque level of at least one of engine torque and electric motor torque level after the transient torque event is finished.

4. The method as defined in claim 3 wherein readjusting torque level comprises readjusting both engine torque and electric motor torque level once the transient torque event is finished.

5. The method of claim 1 wherein the transient torque request comprises an accelerator pedal tip-in and wherein additional torque is provided by the motor while maintaining engine torque substantially constant.

6. A hybrid electric vehicle, comprising:
an engine;
an automatic transmission having a torque converter with an impeller, a turbine, and a bypass clutch;
a traction motor coupled to the impeller and selectively coupled to the engine by a disconnect clutch;
a controller configured to control the bypass clutch to maintain non-zero slip between the impeller and the turbine to a target slip during a torque demand change by calculating a command for bypass clutch pressure based on a feed forward control using the traction motor torque needed to meet the torque demand, and controlling the command based on feedback control of the slip between the impeller and the turbine.

7. The vehicle of claim 6 wherein the controller is configured to modulate apply pressure of the bypass clutch to control the slip between the impeller and the turbine.

8. The vehicle of claim 6 wherein the controller is configured to control slip when the torque demand change is less than a corresponding threshold.

9. The vehicle of claim 8 wherein the controller is configured to adjust at least one of the engine torque and the motor torque once the torque demand change is finished.

10. The vehicle of claim 9 wherein the controller is configured to adjust both the engine torque and the motor torque once the torque demand change is finished.

11. A hybrid vehicle, comprising:
an engine;
an electric machine operable as a traction motor or generator selectively coupled by a disconnect clutch to the engine;
a battery coupled to the electric machine and tractive power to the electric machine when operating as a traction motor and storing energy from the electric machine when operating as a generator;
a step-ratio automatic transmission having a torque converter with an impeller fluidly coupled to a turbine and a bypass clutch operable in an open mode, a locked mode that mechanically couples the turbine and the impeller, and a slip mode;
a controller in communication with the engine, the electric machine, and the automatic transmission, the controller configured to operate the bypass clutch in the slip mode and control a speed difference between the impeller and the turbine in response to a transient torque request, the controller commanding an electric machine torque to meet the transient torque request while maintaining engine torque substantially constant, and applying feed forward control of bypass clutch pressure based on the electric machine torque and feedback control of the bypass clutch pressure based on the speed difference to maintain torque converter torque ratio substantially constant during the transient torque request.

12. The vehicle of claim 11 wherein the controller is further configured to operate the bypass clutch in one of the slip mode and the open mode based on the transient torque request relative to an associated threshold.

13. The vehicle of claim 11 wherein the controller is configured to operate the electric machine as a generator in response to the transient torque request while maintaining the engine torque substantially constant.

14. The vehicle of claim 11 wherein the controller is configured to operate the bypass clutch in the slip mode in response to the transient torque request being less than an associated threshold.

15. The vehicle of claim 11 wherein the controller is configured to determine a current torque converter torque ratio in response to the transient torque request and determine a desired speed difference based on the torque ratio to maintain a substantially constant torque ratio during the transient torque event.

* * * * *